United States Patent
Polak

(10) Patent No.: US 11,008,255 B2
(45) Date of Patent: May 18, 2021

(54) CONCRETE, A DRY MIXTURE FOR THE PREPARATION OF THIS CONCRETE, AND A METHOD FOR THE PREPARATION OF THIS CONCRETE

(71) Applicant: ERC-TECH a.s., Nove Mesto (CZ)

(72) Inventor: Frantisek Polak, Ricmanice (CZ)

(73) Assignee: ERC-TECH a.s., Nove Mesto (CZ)

( * ) Notice: Subject to any disclaimer, the term of this patent is extended or adjusted under 35 U.S.C. 154(b) by 0 days.

(21) Appl. No.: 16/499,388

(22) PCT Filed: Mar. 26, 2018

(86) PCT No.: PCT/CZ2018/050012
§ 371 (c)(1),
(2) Date: Sep. 30, 2019

(87) PCT Pub. No.: WO2018/177447
PCT Pub. Date: Oct. 4, 2018

(65) Prior Publication Data
US 2020/0062647 A1 Feb. 27, 2020

(30) Foreign Application Priority Data

Mar. 31, 2017 (CZ) ................................ CZ2017-187
Mar. 21, 2018 (CZ) ................................ CZ2018-141

(51) Int. Cl.
| | | |
|---|---|---|
| *C04B 18/16* | (2006.01) | |
| *C04B 14/06* | (2006.01) | |
| *C04B 28/02* | (2006.01) | |
| *C04B 111/28* | (2006.01) | |

(52) U.S. Cl.
CPC .......... *C04B 18/167* (2013.01); *C04B 14/062* (2013.01); *C04B 28/02* (2013.01); *C04B 2111/28* (2013.01)

(58) Field of Classification Search
CPC ..... C04B 14/062; C04B 18/167; C04B 28/02; C04B 2111/28; C04B 14/185; C04B 16/08; C04B 18/08; C04B 18/16; C04B 18/141; C04B 18/146; C04B 18/165; C04B 20/0076; C04B 40/0028; C04B 40/0608; Y02W 30/91
See application file for complete search history.

(56) References Cited

U.S. PATENT DOCUMENTS

| | | | | |
|---|---|---|---|---|
| 10,029,951 | B2 * | 7/2018 | Juilland | C04B 20/0076 |
| 2009/0288582 | A1 * | 11/2009 | Glessner | C04B 28/04 |
| | | | | 106/708 |
| 2018/0179107 | A1 * | 6/2018 | Gao | C04B 18/141 |

FOREIGN PATENT DOCUMENTS

| | | | |
|---|---|---|---|
| AU | 2010224346 A1 * | 4/2011 | |
| CN | 103319121 A * | 9/2013 | |
| CN | 106431493 A * | 2/2017 | |
| CN | 106699069 A * | 5/2017 | |
| CN | 107673695 A * | 2/2018 | |
| CN | 108298914 A * | 7/2018 | |
| FR | 3 021 652 A1 | 12/2015 | |
| WO | WO-2007013803 A2 * | 2/2007 | |

OTHER PUBLICATIONS

PCT Search Report, dated Jun. 18, 2018.
Meyer et al: "The greening of the concrete industry", Cement and Concrete Composites, Elsevier Applied Science, Barking, GB, vol. 31, No. 8, Sep. 1, 2009 (Sep. 1, 2009), pp. 601-605.

* cited by examiner

*Primary Examiner* — Anthony J Green
(74) *Attorney, Agent, or Firm* — Dority & Manning, P.A.

(57) ABSTRACT

A method for preparation of 1 m³ of fresh concrete includes mixing 1000 to 2000 kg of aggregate in a forced circulation mixer, wherein 40% to 100% by weight of the aggregate is recyclate made from inert construction and demolition waste. Microsilica is added to the mixture under constant mixing, and the mixture is then mixed for 40 to 80 seconds, whereby the microsilica covers particles of the recyclate and fills up pores in the recyclate. Then under constant mixing, cement or cement and at least one substituent of cement is added to the mixture in a total amount of 135 to 600 kg, and the mixture is further mixed while sprinkling or spraying the mixture with 135 to 250 kg of mixing water for under constant mixing such that a surface of the cement is gradually wetted and a cementing compound being formed gradually adheres to the particles of the recyclate already coated with the microsilica. The mixture is continued to be mixed for 80 to 160 seconds, wherein fresh concrete is prepared.

28 Claims, No Drawings

CONCRETE, A DRY MIXTURE FOR THE PREPARATION OF THIS CONCRETE, AND A METHOD FOR THE PREPARATION OF THIS CONCRETE

TECHNICAL FIELD

The invention relates to fresh concrete and a dry mixture for preparation of the concrete.

In addition, the invention relates to a concrete building element or a prefabricated element made from this concrete.

The invention also relates to a method for the preparation of this fresh concrete.

BACKGROUND ART

According to qualified estimates, approximately 6.5 billion tonnes of inert construction and demolition waste is produced worldwide every year. A substantial majority of this waste accumulates in landfills and dumps, and only a relatively small part is used or processed—most often, however, in a way that does not exploit the full potential of this material, when it serves as a matter of fact merely to fill up empty space. Crushed or ground inert construction and demolition waste is used mainly for packs and backfills of utility lines (a substitute for sorted gravel), as a sub-base for parking lots, roads, concrete structures of floors of buildings and halls, backfills of forefields of bridges, for consolidation and levelling of forest and field roads (a substitute for a crusher-run material), or as a sub-base filler of ground bodies of driveways and roads, trackbeds, flood protection barriers (a substitute for soil), etc.

In addition, processes for the preparation of concrete in which crushed or ground inert construction and demolition waste is used as replacement of part of aggregate are also known. A common disadvantage of these processes, typical of which is, for example, the process described in CN 105036660, and which are based on standard procedures for the preparation of standard concretes, is that the concrete being prepared either does not achieve the required mechanical and physical parameters or these parameters are achieved only at the cost of large cement additions (and the resulting increase in production costs).

It is therefore the aim of the present invention to provide a method for the preparation of concrete with replacement of the largest possible part of aggregate with recyclate formed by grinding or crushing inert construction and demolition waste, which would enable to prepare concrete with mechanical and physical parameters comparable to conventional concretes and, at the same time, would not require above-standard additions of cement or any other component.

In addition, the aim of the invention is also to provide such concretes and dry mixtures prepared by this method.

PRINCIPLE OF THE INVENTION

The objective of the invention is achieved by fresh concrete whose principle consists in that in 1 m³ it contains 135 to 250 kg of water, 135 to 400 kg of cement or 135 to 600 kg of a mixture of cement and substituents of cement in a ratio of cement to substituents of cement from 30:70 to 70:30, 28 to 52 kg of microsilica and 1000 to 2000 kg of aggregate, whereby 40 to 100% of the aggregate is formed by recyclate from inert construction and demolition waste, 0 to 30% of the aggregate is formed by natural aggregate (extracted and/or crushed) and 0 to 30% of the aggregate is formed by lightweight artificial aggregate and/or cinder and/or scoria and/or polystyrene and/or at least one organic filler, or another component for improving thermal and/or acoustic and/or fire resistance properties of hardened concrete.

In a preferred embodiment, this concrete contains in 1 m³ 180 to 230 kg of water, 170 to 210 kg of cement or 170 to 600 kg, preferably 170 to 410 kg, of a mixture of cement and substituents of cement in a ratio of cement to substituents of cement from 30:70 to 70:30, 35 to 45 kg of microsilica and 1355 to 1660 kg of brick recyclate, which is recyclate made from inert construction and demolition waste, which consists entirely or of at least a majority of crushed bricks (possibly with addition of rubble made from other construction materials and/or substances), or of ceramic recyclate, which is recyclate made from inert construction and demolition waste, which consists entirely or of at least of a majority of crushed ceramics from ceramic building and fitting elements, such as floor and wall tiles, ceramic sanitary ware products, clay roofing tiles, etc. (possibly with addition of rubble made from other construction materials and/or substances) or of mixed recyclate from inert construction and demolition waste consisting of rubble made from mixed inert construction and demolition waste, which usually contains bricks, concrete, and ceramic building and fitting elements in different rates (possibly with the addition of rubble made from other construction materials and/or substances). The recyclates have a fraction of 0 to 16 mm or 0 to 8 mm, but it may be even higher.

In another preferred variant of embodiment, the concrete according to the invention contains in 1 m³ 170 to 235 kg of water, 170 to 255 kg of cement or 135 to 600 kg, preferably 170 to 455 kg, of a mixture of cement and substituents of cement in a ratio of cement to substituents of cement from 30:70 to 70:30, 35 to 45 kg of microsilica and 945 to 1250 kg of brick or ceramic or mixed recyclate made from inert construction and demolition waste, the recyclate fraction being from 0 to 16 mm or 0 to 8 mm, combined with 350 to 515 kg of natural aggregate with upper fraction of up to 16 mm or up to 8 mm, preferably up to 4 mm, or the concrete according to the invention contains in 1 m³ 165 to 250 kg of water, 170 to 255 kg of cement, 35 to 45 kg of microsilica and 685 to 1075 kg of brick or ceramic or mixed recyclate made from inert construction and demolition waste with the recyclate fraction of 0 to 16 mm, or 0 to 8 mm, combined with 450 to 845 kg of concrete recyclate, which is recyclate made from inert construction and demolition waste, which consists entirely or of at least a majority of crushed concrete or other cement containing materials, such as cement mortars, cement screed, etc. (possibly with the addition of rubble from other construction materials and/or substances). Preferably, the concrete recyclate has a fraction of 0 to 16 mm, or 0 to 8 mm.

In yet another preferred variant of embodiment, this concrete contains in 1 m³ 155 to 220 kg of water, 170 to 255 kg of cement, 35 to 45 kg of microsilica and 1025 to 1320 kg of concrete recyclate with a fraction of 0 to 16 mm or 0 to 8 mm, in combination with 450 to 585 kg of natural aggregate with upper fraction of up to 16 mm or up to 8 mm, preferably up to 4 mm.

If necessary, it may also contain at least one additive or a mixture of two or more additives for concrete in a total amount of up 5% by weight of a batch of cement.

In addition, the aim of the invention is also achieved by a dry mixture for the preparation of fresh concrete whose composition corresponds to the composition of fresh concrete, but without mixing water.

To prepare concrete according to the invention, it is possible to use several different processes which together constitute a single inventive concept, whereby the processes differ from each other only by the specific amount of raw materials and the type of the used recyclate.

In one variant, two-fractional brick or ceramic or mixed recyclate made from inert construction and demolition waste, the recyclate having fractions preferably of 0 to 8 mm and 8 to 16 mm, is mixed for a period of 20 to 40 seconds in a forced circulation mixer. After thorough mixing, a whole batch of microsilica is added to the recyclate during 10 to 15 seconds under constant mixing, and the mixture thus formed is mixed for an additional 40 to 80 seconds. Subsequently, during 10 to 20 seconds under constant mixing, a whole batch of cement is added to it or cement and at least one substituent of cement are added to it during 10 to 20 seconds under constant mixing successively in any order or concurrently, the ratio of cement to substituents of cement being from 30:70 to 70:30, and the mixture thus formed is mixed for an additional 40 to 80 seconds. Next, the mixture is sprinkled with a whole batch of mixing water during 40 to 60 seconds under constant mixing, or the whole batch of the mixing water is sprayed on it during 40 to 60 seconds. After another 80 to 160 seconds of mixing, fresh concrete is prepared, wherein 100% by weight of the aggregate is formed by recyclate made from inert construction and demolition waste.

A dry mixture for the preparation of such fresh concrete is then prepared in an analogous manner, only without the addition of mixing water and with the use of dried recyclate and, if appropriate, also with other added components.

In another variant, two-fractional brick or ceramic or mixed recyclate made from inert construction and demolition waste, with fractions preferably of 0 to 8 mm and 8 to 16 mm, is mixed for a period of 20 to 40 seconds in a forced circulation mixer. After thorough mixing, two-fractional concrete recyclate with fractions preferably of 0 to 8 mm and 8 to 16 mm is added to it under constant mixing, or natural aggregate preferably with upper fraction of up to 16 mm (to a maximum of 30% by weight of the total aggregate) is added to it, and the mixture thus prepared is mixed for another 20 to 40 seconds. Next, a whole batch of microsilica is added to it under constant mixing during 10 to 15 seconds, and the mixture thus obtained is mixed for a further 40 to 80 seconds. After thorough mixing, under constant mixing during 10 to 20 seconds, a whole batch of cement is added to it or cement and at least one substituent of cement are added to it under constant mixing during 10 to 20 seconds successively in any order or concurrently, the ratio of cement to substituents of cement being from 30:70 to 70:30, and the mixture thus prepared is mixed for another 40 to 80 seconds. Subsequently, the mixture is sprinkled with a whole batch of mixing water during 40 to 60 seconds under constant mixing or the whole batch of mixing water is sprayed on it during 40 to 60 seconds. After another 80 to 160 seconds of mixing, fresh concrete is prepared, in which 70 to 100% by weight of the aggregate is formed by recyclate made from inert construction and demolition waste.

A dry mixture for the preparation of such fresh concrete is then prepared in an analogous manner, without the addition of mixing water and with the use of dried recyclate and, if appropriate, also with other added components.

In another variant, two-fractional dedusted concrete recyclate with fractions preferably of 1 to 8 and 8 to 16 mm is mixed for 20 to 40 seconds in a forced circulation mixer. After thorough mixing, a whole batch of microsilica is added to it under constant mixing during 10 to 15 seconds and the mixture thus prepared is mixed for an additional 40 to 80 seconds. After thorough mixing, under constant mixing during 10 to 20 seconds, a whole batch of cement is added to it or cement and at least one substituent of cement are added to it under constant mixing during 10 to 20 seconds successively in any order or concurrently, the ratio of cement to substituents of cement being from 30:70 to 70:30, and the resulting dry mixture is mixed for another 40 to 80 seconds. Subsequently, the mixture is sprinkled with a whole batch of mixing water during 40 to 60 seconds under constant mixing or the whole batch of mixing water is sprayed on it during 40 to 60 seconds. After another 80 to 160 seconds of mixing, fresh concrete is prepared, in which 100% by weight of the aggregate is made up of recyclate made from inert construction and demolition waste.

A dry mixture for the preparation of such fresh concrete is then prepared in an analogous manner, without the addition of mixing water and with the use of dried recyclate and, if appropriate, also with other added components.

In another variant, two-fractional concrete recyclate, having fractions of preferably 0 to 8 mm and 8 to 16 mm, is mixed for 20 to 40 seconds in a forced circulation mixer. After thorough mixing, natural aggregate with upper fraction of preferably up to 16 mm (up to a maximum of 30% by weight of the total aggregate) is added to it under constant mixing and the mixture thus prepared is mixed for another 20 to 40 seconds. Then a whole batch of microsilica is added to it during 10 to 15 seconds under constant mixing and the mixture thus prepared is mixed for another 40 to 80 seconds. After thorough mixing, during 10 to 20 seconds under constant mixing a whole batch of cement is added to it or cement and at least one substituent of cement are added to it during 10 to 20 seconds under constant mixing successively in any order or concurrently, the ratio of cement to substituents of cement being from 30:70 to 70:30, and the mixture thus prepared is mixed for an additional 40 to 80 seconds. Subsequently, the mixture is sprinkled with a whole batch of mixing water for 40 to 60 seconds under constant mixing or the whole batch of mixing water is sprayed on it during 40 to 60 seconds. After another 80 to 160 seconds of mixing, fresh concrete is prepared, in which at least 70% by weight of the aggregate is formed by recyclate made from inert construction and demolition waste.

A dry mixture for the preparation of such fresh concrete is then prepared in an analogous manner, without the addition of mixing water and with the use of dried recyclate and, if appropriate, also with other added components.

If recyclate is used and optionally natural aggregates with upper fraction of up to 8 mm, the same processes are used for the preparation of concrete with a finer texture, sometimes referred to as cement or concrete mortar.

In all the variants, at least one additive or a mixture of two or more additives for concrete may be dissolved in a total amount of up to 5% by weight of a cement batch.

In another variant of embodiment, at least one component or a mixture of more components for concrete in an amount of up to 5% by weight of a cement batch is added only after the dry mixture is sprinkled with mixing water or the mixing water is sprayed on it.

As natural aggregate, extracted and/or crushed natural aggregates are used, with a fraction of 0 to 4 mm.

In other variants, recyclate of the first composition, made from inert construction and demolition waste with upper fraction of preferably up to 16 mm or up to 8 mm, is mixed for a period of 20 to 40 seconds in a forced circulation mixer, after thorough mixing, recyclate of the second composition, made from inert construction and demolition waste with upper fraction of preferably up to 16 mm or up to 8 mm is added to it under constant mixing, and the mixture thus prepared is mixed for 20 to 40 seconds. Subsequently, natural aggregate with upper fraction of preferably up to 16 mm or up to 8 mm is added to it and the mixture thus prepared is mixed for an additional 20 to 40 seconds. After that, 28 to 52 kg of microsilica is added to it during 10 to 15 seconds and the mixture thus prepared is mixed for another 40 to 80 seconds and after thorough mixing, during 10 to 20 seconds under constant mixing, 135 to 400 kg of cement is added to it or cement and at least one substituent of cement in a total amount of 135 to 600 kg are added to it during 10 to 20 seconds under constant mixing successively in any order or concurrently, the ratio of cement to substituents of cement being from 30:70 to 70:30. The resulting mixture is mixed for another 40 to 80 seconds, whereupon it is sprinkled with 135 to 250 kg of mixing water during 40 to 60 seconds under constant mixing, or this amount of mixing water is sprayed on it during 40 to 60 seconds, and after an additional 80 to 160 seconds of mixing, fresh concrete is prepared, in which at least 70% of the aggregate is formed by recyclate made from inert construction and demolition waste. Preferably, a brick or ceramic or mixed recyclate is first added to the mixer, followed by the concrete recyclate, and then by the natural aggregate.

All the components of the concrete or the dry mixture are then dosed while the mixer is running. However, it is possible to stop the operation of the mixer temporarily after the components already added have been thoroughly mixed before adding the next component, or if the mixer design allows it, to reverse the operation of the mixer for the addition of next component. However, these adjustments to the mixer operation have no effect on the properties or consistency of the fresh concrete being prepared (or of the dry mixture being prepared) or on the subsequently hardened concrete and its properties.

Should the need arise, in any of these processes, prior to adding microsilica, it is possible to add to the mixture at least one improving component which enhances thermal and/or acoustic and/or fire resistance properties of concrete, such as lightweight artificial aggregates (agloporite, ceramsite, expandite, expanded perlite, etc.), cinder, scoria, at least one organic filler (wood sawdust and shavings, rice husks, shives, etc.), polystyrene, etc., in an amount of up to 30% by weight of the aggregate, preferably up to 20 or 15% by weight of the total aggregate. This component is added under constant mixing and mixed with the other components which make up the aggregate for 20 to 40 seconds.

In another variant, the first part of the total batch of the aggregate formed by recyclate made from inert construction and demolition waste is mixed for 20 to 40 seconds in a forced circulation mixer, subsequently the first part of the total batch of microsilica is added to it during 10 to 15 seconds, and the mixture thus prepared is mixed for 20 to 60 seconds. Then, under constant mixing, the second part of the total batch of the aggregate formed by recyclate made from inert construction and demolition waste or by natural aggregate is added to it, and the mixture thus prepared is mixed for 20 to 40 seconds and after that the second part of the batch of microsilica is added to it during 10 to 15 seconds, whereby the total amount of the aggregate in 1 $m^3$ of fresh concrete is 1000 to 2000 kg, 40 to 100% of this aggregate being composed of recyclate made from inert construction and demolition waste, and the total batch of microsilica in 1 $m^3$ of fresh concrete is 28 to 52 kg. The mixture thus prepared is mixed for 40 to 80 seconds and after thorough mixing, during 10 to 20 seconds under constant mixing, 135 to 400 kg of cement is added to it or cement and at least one substituent of cement in a total amount of 135 to 600 kg are added to it during 10 to 20 seconds under constant mixing successively in any order or concurrently, the ratio of cement to substituents of cement being from 30:70 to 70:30, and the mixture thus prepared is mixed for another 40 to 80 seconds, whereupon, under constant mixing, it is sprinkled with 135 to 250 kg of mixing water for 40 to 60 seconds or this amount of the mixing water is sprayed on it during 40 to 60 seconds and, after another 80 to 160 seconds of mixing, fresh concrete is prepared.

The first and the second parts of the total batch of the aggregate may be formed by recyclate made from inert construction and demolition waste having the same composition and/or fraction, or, on the contrary, with different compositions and/or fractions.

In another variant, the first part of the total batch of the aggregate formed by recyclate made from inert construction and demolition waste is mixed for 20 to 40 seconds in a forced circulation mixer, subsequently the first part of the total batch of microsilica is added to it during 10 to 15 seconds, and the mixture thus prepared is mixed for 20 to 60 seconds. Next, under constant mixing, the second part of the total batch of the aggregate composed of recyclate from inert construction and demolition waste or of natural aggregate is added to it and the mixture thus prepared is mixed for 20 to 40 seconds. Subsequently, the second part of the batch of microsilica is added to it during 10 to 15 seconds and the mixture thus prepared is mixed for 20 to 60 seconds. After that, the third part of the total batch of the aggregate composed of recyclate made from inert construction and demolition waste or of natural aggregate is added to it under constant mixing and the mixture thus prepared is mixed for 20 to 40 seconds. Subsequently, the second part of the batch of microsilica is added to it during 10 to 15 seconds, whereby the total amount of the aggregate in 1 $m^3$ of fresh concrete is 1000 to 2000 kg and 40 to 100% of this aggregate is formed by recyclate made from inert construction and demolition waste, and the total batch of microsilica in 1 $m^3$ of fresh concrete is 28 to 52 kg. The mixture thus prepared is mixed for 40 to 80 seconds and after thorough mixing, during 10 to 20 seconds under constant mixing, 135 to 400 kg of cement is added to it, or cement and at least one substituent of cement in a total amount of 135 to 600 kg are added to it during 10 to 20 seconds under constant mixing successively in any order or concurrently, the ratio of cement to substituents of cement being from 30:70 to 70:30. The mixture thus prepared is mixed for another 40 to 80 seconds, whereupon, under constant mixing, 135 to 250 kg of mixing water is sprinkled on it for 40 to 60 seconds, or it is sprayed by this amount of the mixing water during 40 to 60 seconds, and after another 80 to 160 seconds of mixing, fresh concrete is prepared.

At least two parts of the total batch of the aggregate may be formed by recyclate made from inert construction and demolition waste with the same composition and/or fraction, or, on the contrary, with different compositions and/or fractions.

EXAMPLES OF EMBODIMENT

The method for the preparation of concrete according to the invention is based on a combination of a specific composition of the concrete and a specific process, which in mutual combination allow to replace up to 100% by weight of the aggregate in the concrete with recyclate made from inert construction and demolition waste (i.e. ground or crushed inert construction and demolition waste) and to achieve mechanical and physical parameters which are at least comparable to standard concretes.

Recyclate made from inert construction waste can have substantially any fraction depending on the concrete use and specific requirements for concrete, but preferably it has a fraction of 0 to 16 mm or 1 to 16 mm (if only concrete recyclate is used as an aggregate), or 0 to 8 mm or 1 to 8 mm (if only recycled concrete is used as an aggregate).

The fresh concrete thus prepared contains in 1 m$^3$ 135 to 250 kg of water, 135 to 400 kg of cement, 28 to 52 kg of microsilica and 1000 to 2000 kg of aggregate, whereby 40 to 100% by weight of the aggregate is formed by brick or ceramic or mixed recyclate made from mixed inert construction and demolition waste having a fraction of preferably 0 to 16 mm (in a preferred variant, it is two-fractional recyclate with fractions of 0 to 8 mm and 8 to 16 mm), or 0 to 8 mm, and/or concrete recyclate with a fraction of preferably 0 to 16 mm (in a preferred variant, it is two-fractional recyclate with fractions of 0 to 8 mm and 8 to 16 mm), or 1 to 16 mm (in a preferred variant, it is two-fractional recyclate with fractions of 1 to 8 mm and 8 to 16 mm), or 0 to 8 mm, or 1 to 8 mm.

The terms used throughout this application include "brick recyclate", under which we mean a recycled material made by crushing or milling inert construction and demolition waste, which consists entirely or of at least a majority of bricks and possibly contains other building materials and/or substances (concrete, ceramic building elements and fittings, mortar, plaster and adhesive residues, etc.). Thus, brick recyclate consists entirely or of at least a majority of crushed bricks, possibly with the addition of rubble from other building materials and/or substances. Under the term "ceramic recyclate" we mean a recycled material made by crushing or milling inert construction and demolition waste, which consists entirely or of at least a majority of ceramic building and fitting elements, such as floor and wall tiles, sanitary ceramic products, clay roofing tiles, etc., and possibly contains other building materials and/or substances (concrete, bricks, mortar, plaster and adhesive residues, etc.). Thus, ceramic recyclate consists entirely or of at least a majority of crushed ceramics, possibly with the addition of rubble from other building materials and/or substances. Under the term "concrete recyclate" we mean a recycled material made by crushing or milling inert construction and demolition waste, which consists entirely or of at least a majority of concrete or another cement containing material (e.g. concrete screed, cement mortar, etc.), and possibly contains other building materials and/or substances (bricks, ceramic building and fitting objects, mortar, plaster and adhesive residues, etc.). Thus, concrete recyclate consists entirely or of at least a majority of crushed concrete or other cement containing materials, possibly with the addition of rubble from other building materials and/or substances. Under the term "mixed recyclate" we mean a recycled material made by crushing or milling mixed inert construction and demolition waste, which is formed by a mixture of different building materials and substances, usually bricks, concrete and ceramic building elements and fittings in various rates, possibly with the addition of mortar, plaster and adhesive residues, etc. Thus, mixed recyclate consists of rubble made from mixed construction and demolition waste.

Fractions of all these recyclates may vary according to the intended application and specific requirements for concrete, preferably these fractions are 0 to 16 mm, or 1 to 16 mm, or 0 to 8 mm, or 1 to 8 mm.

Any remaining part of the aggregate—up to a maximum of 30% by weight, is formed by natural aggregates (extracted and/or crushed) with upper fraction of preferably up to 16 mm, or up to 8 mm, or up to 4 mm. Another 0 to 30% by weight of the aggregate, preferably 0 to 20 or 0 to 15% by weight of the aggregate may be in case of need formed by at least one known improving component which enhances thermal and/or acoustic and/or fire resistance properties of concrete and is commonly used in standard concretes. Such compositions include, e.g., lightweight artificial aggregates (such as agloporite, ceramsite, expandite, expanded perlite, etc.), cinder, scoria, polystyrene or at least one organic filler (such as wood sawdust, shavings, rice husks, shives, etc.), etc.

When using recyclates made from inert construction and demolition waste and optionally also natural aggregate having a fraction of 0 to 8 mm, fresh concrete with a finer texture is prepared, sometimes referred to as cement or concrete mortar.

In advantageous variants of embodiment, 1 m$^3$ of fresh concrete contains 180 to 230 kg of water, 170 to 210 kg of cement, 35 to 45 kg of microsilica and 1355 to 1660 kg of brick or ceramic or mixed recyclate made from inert construction and demolition waste, the recyclate having a fraction of 0 to 16 mm, or 0 to 8 mm, or 1 m$^3$ of fresh concrete contains 170 to 235 kg of water, 170 to 255 kg of cement, 35 to 45 kg of microsilica and 945 to 1250 kg of brick or ceramic or mixed recyclate made from inert construction and demolition waste, the recyclate having a fraction of 0 to 16 mm or 0 to 8 mm, combined with 350 to 515 kg of natural aggregate with upper fraction of up to 16 mm or up to 8 mm or up to 4 mm, or 1 m$^3$ of fresh concrete contains 165 to 250 kg of water, 170 to 255 kg of cement, 35 to 45 kg of microsilica and 685 to 1075 kg of brick or ceramic or mixed recyclate made from inert construction and demolition waste, the recyclate having a fraction of 0 to 16 mm, or 0 to 8 mm, combined with 450 to 845 kg of concrete recyclate with a fraction of 0 to 16 mm or 0 to 8 mm, or 1 m$^3$ of fresh concrete contains 155 to 220 kg of water, 170 to 255 kg of cement, 35 to 45 kg of microsilica and 1025 to 1320 kg of concrete recyclate with a fraction of 0 to 16 mm, or 0 to 8 mm, combined with 450 to 585 kg of natural aggregate with upper fraction of up to 16 mm, or up to 8 mm, preferably up to 4 mm.

Should the need arise, fresh concrete according to the invention may in any variant contain at least one additive or a mixture of two or more additives conventionally used in concrete in a batch consisting of up to a maximum of 5% by weight of a batch of cement. Any known additive can be used, for example an additive for vibrated concrete and/or additives according to EN 934-2. These include especially water reducing additives (plasticizers) and high range water reducing additives (superplasticizers) to improve the consistency of concrete, reduce the water content, improve strength and some other properties of fresh and hardened concrete, as well as stabilizing additives, air-entraining additives, additives accelerating hardening and solidification of concrete, retarding additives, sealing agents, etc. This additive/these additives is/are added to the other components of the concrete dissolved in the mixing water or independently of the mixing water, preferably after the addition of the mixing water.

To mix the individual components thoroughly and to prepare concretes (or dry mixtures) of the desired structure and properties, any forced circulation mixer is used, preferably a mixer with a radial movement of mixing arms, or with a double simultaneous radial movement of mixing arms (such as the mixer described in IT 1244970 or EP 0508962), in which all its interior surfaces are wiped off. Nevertheless, not only the above-mentioned concrete composition, but also the mixing and dosing times of the individual components in the mixer must be observed (see examples 1-4 and 8-11 below). All the components of the concrete or the dry mixture are then dosed while the mixer is running. However, it is possible to adjust the operation of the mixer after the components already added have been thoroughly mixed together, and temporarily stop the operation of the mixer before adding the next component, or if the mixer design allows it, to reverse the running of the mixer for addition of another component and mixing it together with the other components. However, these adjustments to the mixer operation have no effect on the properties or consistency of the fresh concrete being prepared (or of the dry mixture being prepared) or on the subsequently hardened concrete and its properties.

Prior to the preparation of the concrete or dry mixture according to the invention, recyclate made from inert construction and demolition waste is hygienized, e.g. by water or steam bath or by other methods, thereby reducing the number of (pathogenic) organisms and microorganisms present in it.

Microsilica, which serves as a binder in the standard production of standard concretes from natural aggregates, serves as a filler in the preparation of concrete according to the invention, filling the overall lattice structure of the concrete while observing the below-described dosing method and the above-described mixing method, covering the particles of the recyclate and filling up the pores in it. Thanks to that, there is no clustering of fine particles and the resulting concrete has a lower porosity and after hardening achieves mechanical and physical parameters comparable to standard concretes.

In a preferred variant of embodiment, microsilica is added to the mixer only after the last part of the aggregate, or of the recyclate made from inert construction and demolition waste. In addition, the total batch of microsilica, as well as the total batch of the aggregate, can be divided into two or more smaller parts (of the same or different sizes) and the individual parts of microsilica can be added successively after the addition of the individual parts of the total batch of the aggregate or recyclate from inert construction and demolition waste of various types and/or fractions, or at least of some parts of the batch of microsilica can be added simultaneously with some parts of the aggregate or recyclate (see, e.g., examples 12 to 15).

In all variants, cement with a specific surface area of at least 330 $m^2 \cdot kg^{-1}$ or greater (e.g. cement of strength class CEM I 42.5 or higher) is used. Its dosing as described below ensures an appropriate bond between the cement and the recyclate which has been coated with microsilica, as well as very good homogenization of the mixture being mixed.

Furthermore, part of the batch of cement may be replaced with a substituent of cement, e.g., with ground slag (ground-granulated blast-furnace slag—GGBS or GGBFS) and/or with fly ash, or with a mixture of at least two such substituents, the ratio of cement to substituents of cement in the fresh concrete being from 30:70 to 70:30. This means that the total amount of cement and substituents of cement is the same as the amount of the cement alone, i.e. 135 to 400 kg/$m^3$ of fresh concrete, or up to 600 kg/$m^3$ of fresh concrete. Cement and at least one substituent of cement are added to the mixture separately, at the same time or successively in any order (adding substituents of cement first and then cement is preferred, but is not necessary), or in the form of a premixture of the above-described composition.

After the preparation of the dry mixture from the above-mentioned components and after thorough mixing, this mixture is sprinkled with mixing water in a mixer under constant mixing, or the mixing water is sprayed on it. When using this dosing of the mixing water in combination with constant mixing in a forced circulation mixer, the surface of the cement is gradually getting wet and the cementing compound being formed gradually adheres to the grains of the recyclate already coated with microsilica, which prevents the agglomeration of fresh concrete particles, separation of the fine particles of the mixture and water separation and ensures the required consistency of the fresh concrete. In addition, this dosing method activates the silica in the fine particles of the recyclate and in the microsilica and thus also latent hydraulicity of these components, which allows the concretes prepared by this method to achieve physical and mechanical parameters comparable to standard concretes, even at a batch of cement which may be lower than that for standard concretes (in some variants 190 to 230 kg/$m^3$—see, e.g., examples 5, 6 and 7).

The mixing water quality must correspond to the drinking water. If required, it may contain at least one known standard additive (dissolved or undissolved) for concrete.

To supplement recyclate made from inert construction and demolition waste, it is possible to use natural aggregate (extracted and/or crushed) with upper fraction of preferably up to 16 mm or up to 8 mm, or even fine extracted aggregates with a fraction of 0 to 4 mm.

Four exemplary processes for the preparation of fresh concrete (and the dry mixture for the preparation of this concrete) according to the invention are described below, the first of which for the case when 100% by weight of the aggregate is formed by two-fractional mixed recyclate made from inert construction and demolition waste, the recyclate having fractions of 0 to 8 mm and 8 to 16 mm, the second process for the case when the aggregate is formed by two-fractional mixed recyclate made from inert construction and demolition waste, the recyclate having fractions of 0 to 8 mm and 8 to 16 mm, in combination with two-fractional concrete recyclate with fractions of 0 to 8 mm and 8 to 16 mm or with natural aggregate with upper fraction of up to 16 mm (up to 30% by weight of the total aggregate), the third process for the case when 100% by weight of the aggregate is formed by two-fractional concrete recyclate with fractions of 1 to 8 mm and 8 to 16 mm, and the fourth process for the case when the aggregate is formed by two-fractional concrete recyclate with fractions of 0 to 8 mm and 8 to 16 mm in combination with natural aggregate with upper fraction of up to 16 mm (up to 30% by weight of the total aggregate). As is apparent to a person skilled in the art, the intervals, or, more specifically, the periods of time during which individual components are added, as well as the amounts of these components, are determined by the technological requirements for hardened concrete and its mechanical and physical parameters and can vary within the whole intervals stated below. Likewise, the upper fraction of the recyclate/recyclates and/or of the natural aggregate in other examples may be greater than 16 mm.

Analogically within an aggregate, it is possible to combine in other variants brick or ceramic or mixed recyclate made from inert construction and demolition waste with concrete recyclate and with up to 30% by weight of natural aggregate. Preferably, brick or ceramic or mixed recyclate made from inert construction and demolition waste is first added to the mixer, followed by the concrete recyclate, and then by the natural aggregate. The brick, ceramic or mixed recyclates made from inert construction and demolition waste have similar properties and behaviour and are therefore mutually interchangeable or can be mixed together.

Between the batches of recyclate from construction and demolition waste of various types and/or fractions, and/or batches of natural aggregate, or simultaneously with them, parts of the whole batch of microsilica can be successively added to the mixer.

Example 1

To prepare concrete according to the invention, two-fractional mixed recyclate made from inert construction and demolition waste with fractions of 0 to 8 mm and 8 to 16 mm is mixed for 20 to 40 seconds in a forced circulation mixer with a radial or double simultaneous radial movement of the mixing arms. After thorough mixing, a whole batch of microsilica is added to it during 10 to 15 seconds under constant mixing and the mixture thus prepared is mixed for another 40 to 80 seconds. After that, a whole batch of cement is added to it during 10 to 20 seconds under constant mixing and the mixture thus prepared is mixed for another 40 to 80 seconds. Subsequently, the mixture is sprinkled with a whole batch of mixing water (which, if appropriate, contains at least one additive conventionally used in concrete) under constant mixing during 40 to 60 seconds or the whole batch of mixing water (which, if appropriate, contains at least one additive conventionally used in concrete) is sprayed on it during 40 to 60 seconds. After an additional 80 to 160 seconds of mixing, fresh concrete is prepared, in which 100% by weight of the aggregate is formed by recyclate made from inert construction and demolition waste.

The preparation of a dry mixture for the preparation of such fresh concrete is then performed in an analogous manner, without the addition of mixing water and with the use of dried recyclate and, if appropriate, also with other added components.

Example 2

To prepare concrete according to the invention, two-fractional mixed recyclate made from inert construction and demolition waste with fractions of 0 to 8 mm and 8 to 16 mm is mixed for 20 to 40 seconds in a forced circulation mixer with a radial or double simultaneous radial movement of the mixing arms. After thorough mixing, two-fractional concrete recyclate with fractions of 0 to 8 mm and 8 to 16 mm or natural aggregate with upper fraction of up to 16 mm (up to a maximum of 30% by weight of the total aggregate) is added to it under constant mixing and the mixture thus prepared is mixed for another 20 to 40 seconds. Next, a whole batch of microsilica is added to it during 10 to 15 seconds under constant mixing and the mixture thus prepared is mixed for a further 40 to 80 seconds. After thorough mixing, a whole batch of cement is added to it during 10 to 20 seconds under constant mixing and the mixture thus prepared is mixed for another 40 to 80 seconds. Subsequently, the mixture is sprinkled with a whole batch of mixing water (which, if appropriate, contains at least one additive conventionally used in concrete) during 40 to 60 seconds under constant mixing or the whole batch of mixing water (which, if appropriate, contains at least one additive conventionally used in concrete) is sprayed on it during 40 to 60 seconds. After an additional 80 to 160 seconds of mixing, fresh concrete is prepared, in which 70 to 100% by weight of the aggregate is formed by recyclate made from inert construction and demolition waste.

A dry mixture for the preparation of such fresh concrete is then prepared in an analogous manner, without the addition of mixing water and with the use of dried recyclate and, if appropriate, also with other added components.

Example 3

To prepare concrete according to the invention, two-fractional dedusted concrete recyclate with fractions of 1 to 8 and 8 to 16 mm is mixed for 20 to 40 seconds in a forced circulation mixer with a radial or double simultaneous radial movement of the mixing arms. After thorough mixing, a whole batch of microsilica is added to it during 10 to 15 seconds under constant mixing and the mixture thus prepared is mixed for a further 40 to 80 seconds. After thorough mixing, a whole batch of cement is added to it during 10 to 20 seconds under constant mixing and the dry mixture thus prepared is mixed for another 40 to 80 seconds. Subsequently, the mixture is sprinkled with a whole batch of mixing water (which, if appropriate, contains at least one additive conventionally used in concrete) under constant mixing during 40 to 60 seconds or the whole batch of mixing water (which, if appropriate, contains at least one additive conventionally used in concrete) is sprayed on it during 40 to 60 seconds. After an additional 80 to 160 seconds of mixing, fresh concrete is prepared, in which 100% by weight of the aggregate is formed by recyclate made from inert construction and demolition waste.

A dry mixture for the preparation of such fresh concrete is then prepared in an analogous manner, without the addition of mixing water and with the use of dried recyclate and, if appropriate, also with other added components.

Example 4

To prepare concrete according to the invention, two-fractional concrete recyclate with fractions of 0 to 8 mm and 8 to 16 mm is mixed for 20 to 40 seconds in a forced circulation mixer with a radial or double simultaneous radial movement of the mixing arms. After thorough mixing, natural aggregate with upper fraction of up to 16 mm (up to a maximum of 30% by weight of the total aggregate) is added to it under constant mixing and the mixture thus prepared is mixed for an additional 20 to 40 seconds. Next, a whole batch of microsilica is added to it during 10 to 15 seconds under constant mixing and the mixture thus prepared is mixed for another 40 to 80 seconds. After thorough mixing, a whole batch of cement is added to it during 10 to 20 seconds under constant mixing and the mixture thus prepared is mixed for a further 40 to 80 seconds. Subsequently, the mixture is sprinkled with a whole batch of mixing water (which, if appropriate, contains at least one additive conventionally used in concrete) during 40 to 60 seconds under constant mixing or the whole batch of mixing water (which, if appropriate, contains at least one additive conventionally used in concrete) is sprayed on it during 40 to 60 seconds. After another 80 to 160 seconds of mixing, fresh concrete is prepared, in which at least 70% by weight of the aggregate is formed by recyclate made from inert construction and demolition waste.

A dry mixture for the preparation of such fresh concrete is then prepared in an analogous manner, without the addition of mixing water and with the use of dried recyclate and, if appropriate, also with other added components.

In all cases, after adding the last component of the aggregate (i.e. recyclate or natural aggregate) and before adding microsilica to the mixture thus prepared, it is possible to add to the mixture after adding the last component of the aggregate at least one known improving component, which enhances thermal and/or acoustic and/or fire resistance properties of concrete and which is commonly used in standard concretes. Such additives include, e.g., lightweight artificial aggregates (such as agloporite, ceramsite, expandite, expanded perlite, etc.), cinder, scoria, polystyrene or at least one organic filler (e.g., wood sawdust and shavings, rice husks, shives, etc.) etc. This additive constitutes up to 30% by weight of the aggregate, preferably up to 20% by weight or up to 15% by weight of the total aggregate.

A total of 11 specific examples of fresh concrete prepared by the method according to the invention are shown below with the results of tests of these fresh and subsequently hardened concretes (after 7 and 28 days). The ratio of the fractions of these recycled materials in these examples is 40% by weight of fractions of 0 to 8 mm or 1 to 8 mm, and 60% by weight of fractions of 8 to 16 mm, but generally their ratio may be in the range from 30:70 to 50:50. The recyclate made from construction and demolition waste having a fraction from 0 to 8 mm or from 1 to 8 mm may be formed by two fractions of the recyclate, e.g. from 0 to 4 mm and from 4 to 8 mm, or from 1 to 4 mm and from 4 to 8 mm; the recyclate made from construction and demolition waste having a fraction from 0 to 16 mm, or from 1 to 16 mm may be formed by two fractions of the recyclate, e.g., from 0 to 8 mm and from 8 to 16 mm, or from 1 to 8 mm and from 8 to 16 mm, or by three fractions of this recyclate, e.g. from 0 to 4 mm, from 4 to 8 mm and from 8 to 16 mm, or, optionally, by more fractions.

Example 5

Prepared by the method described in Example 1 was 1 m³ of concrete, which contained 1505 kg of two-fractional mixed recyclate made from inert construction and demolition waste with fractions of 0 to 8 mm and 8 to 16 mm, 40 kg of microsilica (MICROSILICA-SIOXID®, manufacturer OFZ, a.s., Istebne, Slovak Republic), 190 kg of cement and 205 kg of water.

The fresh concrete thus prepared was tested for consistency by a method according to EN 12350-2, whereby the measured slump value of 35 mm corresponds to grade S1. In addition, the air content was measured by a method according to EN 12350-7, whereby the average air content of 3.4% corresponds to standard non-aerated concretes.

150 mm cubes were created from this fresh concrete for the compressive strength test according to EN 12390-3, prisms with dimensions of 100 mm×100 mm×400 mm were created for testing flexural strength according to EN 12390-5, for the measurement of volume changes according to ČSN (Czech Technical Standard) 73 1320, for the measurement of static modulus of elasticity according to ISO 1920-10 and plates with dimensions of 200 mm×200 mm×50 mm were created for thermal conductivity test. After the hardening of the concrete, the test bodies were removed from the mouldson the following day and stored for the appropriate tests in an air-conditioned chamber at a temperature of 20±2° C. and a relative humidity above 95%. In these tests, the following parameters were measured: compressive strength (the average of three measurements) 19.7 MPa after 7 days, compressive strength (the average of three measurements) 32.0 MPa after 28 days, flexural strength 2.6 MPa after 28 days, volume changes 1.278‰ (after 28 days), static modulus of elasticity 12.5 GPa and thermal conductivity 0.46 W/(m·K).

In addition, the chloride content in this concrete as calculated according to EN 196-2 and EN 1744-1 was 0.118%, the content of natural radionuclides was determined according to the procedure of Regulation No. 307/2002 Coll. of the State Office for Nuclear Safety on Radiation Protection, as amended, which was 27 Bq/kg and the mass activity index was 0.40, whereby both these parameters meet the requirements of this Regulation for use in buildings with residential rooms or spaces (mass activity $^{226}Ra \leq 150$ Bq·kg$^{-1}$, mass activity index I≤0.5). According to the procedure of EN 12457 and Regulation of the Ministry of the Environment No. 294/2005 Coll. its ecotoxicity was found to be complying with the requirements. The criteria for determination of ecotoxicity are shown in Table 1.

TABLE 1

| Tested organism | Exposure time [hours] | I | II |
|---|---|---|---|
| Water arthropod Daphnia magna | 48 | Max. immobilization 30% | Max. immobilization 30% |
| Aquatic vertebrate Poecillia reticulata | 96 | without death and behavioural change | without death and behavioural change |
| Alga Desmodesmus subspicatus | 72 | Max. inhibition 30% | Max. change in growth 30% |
| Seeds of the plant Sinapis alba | 72 | Max. inhibition 30% | Max. change in growth 30% |

With its mechanical and physical parameters, this concrete corresponds to the standard concrete of strength class C 20/25 and to the classification classes of use—specification X0, XC1 and XC2 according to ČSN (Czech Technical Standard) EN 206—see Table 2.

TABLE 2

| Class designation | Description of the environment | Informative examples where exposure classes may occur |
|---|---|---|
| for concrete with no risk of corrosion or attack | | |
| X0 | For concrete without reinforcement or embedded metal inserts. All exposures, except where there is freeze/thaw, abrasion or aggressive chemical environment For reinforced concrete or concrete with embedded metal inserts: Very dry | Concrete inside buildings with very low humidity |
| for concrete with the risk of corrosion induced by carbonation | | |
| XC1 | Dry or permanently wet. | Concrete inside buildings with very low humidity; Concrete permanently submerged in water. |
| XC2 | Wet, rarely dry. | Concrete surfaces subject to long-term water contact; Most foundations. |
| XC3 | Moderate humidity. | Concrete inside buildings with moderate or high air humidity; External concrete sheltered from rain. |

TABLE 2-continued

| Class designation | Description of the environment | Informative examples where exposure classes may occur |
|---|---|---|
| XC4 | Cyclic wet and dry | Concrete surfaces subject to water contact, not within exposure Class XC2 |
| for concrete with the risk of corrosion induced by chlorides other than from sea water | | |
| XD1 | Moderate humidity. | Concrete surfaces exposed to airborne chlorides. |
| XD2 | Wet, rarely dry. | Swimming pools. Concrete exposed to industrial waters containing chlorides. |
| for concrete exposed to freeze/thaw attack, without chemical de-icing agents | | |
| XF1 | Moderate water saturation, without de-icing agent | Vertical concrete surfaces exposed to rain and freezing |

Example 6

A total of 7 samples of fresh concrete according to the invention were prepared by the process described in Example 2, whereby the composition of 1 $m^3$ of each of them is described in Table 3.

TABLE 3

| Sample Component | CB 1/1 | CB 1/2 | CB 1/4 | CB 1/7 | CB 1/9 | CB 1/10 | CB 1/11 |
|---|---|---|---|---|---|---|---|
| Natural aggregate, fraction of 0 to 4 mm [kg] | 420 | 390 | 0 | 465 | 0 | 450 | 0 |
| Mixed recyclate from inert construction and demolition waste, fractions of 0 to 8 and 8 to 16 mm [kg] | 1 125 | 1 135 | 865 | 1 135 | 765 | 1 055 | 975 |
| Concrete recyclate, fractions of 0 to 8 and 8 to 16 mm [kg] | 0 | 0 | 660 | 0 | 765 | 0 | 460 |
| Microsilica [kg] | 40 | 40 | 40 | 40 | 40 | 40 | 40 |
| Cement [kg] | 230 | 230 | 230 | 190 | 190 | 230 | 230 |
| Plasticizer or superplasticizer [kg] | 0 | 0 | 0 | 0.95 | 0.92 | 1.17 | 1.31 |
| Water [kg] | 200 | 205 | 195 | 190 | 185 | 210 | 235 |
| Volume weight of concrete at age of 7 days [kg/$m^3$] | 1960 | 1970 | 1950 | 2010 | 1950 | — | — |
| Volume weight of concrete at age of 28 days [kg/$m^3$] | 1950 | 1980 | 1990 | 1970 | 1950 | — | — |

These concretes were subsequently tested as described in example 5 and some of them also tested for depth of penetration of water under pressure according to EN 12390-8, meeting the requirement for a maximum depth of penetration of water of 50 mm, a frost resistance test according to ČSN (Czech Technical Standard) 73 1322 at 100 cycles, meeting the requirements of min. 0.75 and an alkaline-silica expandability test according to ASTM C 1260-94 (prisms with dimensions of 25 mm×25 mm×250 mm). The results of these tests are shown in Table 4.

TABLE 4

| Sample Parameter | CB 1/1 | CB 1/2 | CB 1/4 | CB 1/7 | CB 1/9 | CB 1/10 | CB 1/11 |
|---|---|---|---|---|---|---|---|
| Consistency of fresh concrete - slump of a cone [mm] | 35 | 30 | 40 | 100 | 60 | 160 | 55 |
| Air content in fresh concrete [%] | 3.4 | 3.6 | 2.8 | 1.8 | 2.2 | 5.8 | 4.7 |
| Compressive strength [MPa] After 7 days | 20.1 | 24.0 | 18.7 | 14.2 | 14.9 | 16.7 | 22.6 |
| After 28 days | 32.9 | 35.7 | 41.9 | 28.2 | 26.8 | 28.5 | 33.5 |
| Flexural strength after 28 days [MPa] | 3.2 | — | 2.5 | 1.9 | 3.2 | — | — |

TABLE 4-continued

| Sample Parameter | CB 1/1 | CB 1/2 | CB 1/4 | CB 1/7 | CB 1/9 | CB 1/10 | CB 1/11 |
|---|---|---|---|---|---|---|---|
| Depth of penetration of pressurized water [mm] | 31 | — | 39 | 32 | 30 | — | — |
| Volume changes of concrete [‰] | 1.115 | — | 0.964 | — | — | — | — |
| Frost resistance [—] 100 cycles | — | 1.07 | 0.82 | — | 0.90 | 0.89 | 0.98 |
| Static modulus of elasticity [GPa] | — | 17.5 | 16.0 | 17.5 | 16 | | |
| Chloride content [%] | 0.125 | 0.125 | 0.138 | 0.112 | 0.125 | 0.122 | 0.126 |
| Alkalic-silica expandability [%] | — | — | — | — | — | 0.037 | 0.028 |
| Content of natural radionuclides Mass activity $^{226}Ra$ [Bq·kg$^{-1}$] | — | 24 | 20 | — | — | — | — |
| Mass Activity Index [—] | — | 0.41 | 0.32 | — | — | — | — |
| Ecotoxity | satisfactory | satisfactory | satisfactory | satisfactory | satisfactory | satisfactory | satisfactory |

Table 5 shows the strength classes of concrete to which the given concretes belong according to their mechanical and physical parameters and the classification classes of the specification of concrete uses according to ČSN (Czech Technical Standard) EN 206 (see Table 2).

TABLE 5

| Sample | CB 1/1 | CB 1/2 | CB 1/4 | CB 1/7 | CB 1/9 | CB 1/10 | CB 1/11 |
|---|---|---|---|---|---|---|---|
| Strength class of concrete | C 20/25 | C 25/30 | C 30/37 | C 16/20 | C 16/20 | C 20/25 | C 20/25 |
| Specification of concrete use | X0 XC1 XC2 | X0 XC1 XC2 XC3 XC4 XD1 XD2 XF1 | X0 XC1 XC2 XC3 XC4 XD1 XD2 XF1 | X0 XC1 | X0 XC1 | X0 XC1 XC2 | X0 XC1 XC2 |

Example 7

3 samples of fresh concrete according to the invention were prepared by the process described in Example 4, whereby the composition of 1 m³ of each of them is described in Table 6.

TABLE 6

| | Sample | | |
|---|---|---|---|
| Component | CB 1/5 | CB 1/6 | CB 1/8 |
| Natural aggregate, fraction 0 to 4 mm [kg] | 500 | 515 | 530 |
| Concrete recyclate, fractions 0 to 8 and 8 to 16 mm [kg] | 1165 | 1200 | 1140 |
| Microsilica [kg] | 40 | 40 | 40 |
| Cement [kg] | 230 | 190 | 190 |
| Plasticizer or superplasticizer [kg] | 0 | 0 | 0.86 |
| Water [kg] | 200 | 185 | 175 |
| Volume weight of concrete at age of 7 days [kg/m³] | 2050 | 2100 | 2030 |
| Volume weight of concrete at age of 28 days [kg/m³] | 2080 | 2110 | 2030 |

These concretes were then subjected to the tests described in Examples 5 and 6, with 50 cycles in the frost resistance test. The results of these tests are shown in Table 7.

TABLE 7

| | Sample | | |
|---|---|---|---|
| Parameter | CB 1/5 | CB 1/6 | CB 1/8 |
| Consistency of fresh concrete - slump of a cone [mm] | 120 | 140 | 70 |

TABLE 7-continued

| Parameter | Sample | | |
|---|---|---|---|
| | CB 1/5 | CB 1/6 | CB 1/8 |
| Air content in fresh concrete [%] | 2.4 | 2.5 | 3.0 |
| Compressive strength [MPa] | | | |
| After 7 days | 20.1 | 21.4 | 9.6 |
| After 28 days | 28.5 | 31.3 | 20.1 |
| Flexural strength after 28 days [MPa] | 1.9 | 3.2 | 2.2 |
| Depth of penetration of pressurized water [mm] | — | — | 45 |
| Volume changes of concrete [‰] | — | 1.226 | — |
| Frost resistance [—] 50 cycles | 0.85 | — | 0.90 |
| Static modulus of elasticity [GPa] | 14.5 | 20.5 | 15.5 |
| Chloride content [%] | 0.130 | 0.117 | 0.118 |
| Natural radionuclides content | | | |
| Mass activity $^{226}$Ra [Bq · kg$^{-1}$] | 15 | — | — |
| Mass Activity Index [—] | 0.31 | — | — |
| Ecotoxity | satisfactory | satisfactory | satisfactory |

Table 8 below shows strength classes of concrete to which the given concretes fall due to the mechanical and physical parameters and the classification classes of the specification of the use of these concretes according to ČSN (Czech Technical Standard) EN 206 (see Table 2).

TABLE 8

| | Sample | | |
|---|---|---|---|
| | CB 1/5 | CB 1/6 | CB 1/8 |
| Strength class of concrete | C 16/20 | C 20/25 | C 12/15 |
| Specification of concrete use | X0 XC1 | X0 XC1 XC2 | X0 |

If brick or ceramic or mixed recyclate made from inert construction and demolition waste and/or concrete recyclate with upper fraction of 8 mm is used for the preparation of concrete, or possibly in combination with natural aggregate with upper fraction of up to 8 mm, preferably with extracted aggregate fraction with a fraction of 0 to 4 mm, the preparation of concrete is done in an analogous manner—see the following examples 8 to 11. In that case the composition of fresh concretes and dry mixtures differs from the above described variants only by the aggregate fraction (or the fraction of the recyclate and natural aggregate).

Four exemplary processes for the preparation of the concrete (and the dry mixture for the preparation of the concrete) according to the invention are described below, the first of which is for a case when 100% by weight of the aggregate is formed by mixed recyclate from inert construction and demolition waste with a fraction of 0 to 8 mm, the second relates to a case when the aggregate is formed by mixed recyclate made from inert construction and demolition waste with a fraction of 0 to 8 mm in combination with concrete recyclate with a fraction of 0 to 8 mm or with natural aggregate with upper fraction of up to 8 mm (up to 30% by weight of the total aggregate), the third is for a case when 100% by weight of the aggregate is formed by concrete recyclate with a fraction of 1 to 8 mm, and the fourth relates to a case when the aggregate is formed by concrete recyclate with a fraction of 0 to 8 mm in combination with natural aggregate with upper fraction of up to 8 mm (up to 30% by weight of the total aggregate). Here, too, it is apparent to a person skilled in the art that the intervals, or, more specifically, the periods of time during which individual components are added, as well as the amounts of these components, are determined by the technological requirements for hardened concrete and its mechanical and physical parameters and can vary within the whole intervals stated below. These processes will result in the preparation of concretes with a finer texture than in the previous examples, sometimes referred to as cement or concrete mortars. Their composition is the same as in the previous examples, except the fraction of the recyclate/recyclates.

In other variants, within the aggregate material, it is also possible to combine brick or ceramic or mixed recyclate in an analogous manner with concrete recyclate and with up to 30% by weight of natural aggregate. Preferably, brick or ceramic or mixed recyclate made from inert construction and demolition waste is first added to the mixer, followed by the concrete recyclate and then by the natural aggregate. Brick, ceramic or mixed recyclates made from inert construction and demolition waste have similar properties and behaviour and are therefore mutually interchangeable or can be mixed together.

Example 8

To prepare concrete according to the invention, mixed recyclate made from inert construction and demolition waste with a fraction of 0 to 8 mm is mixed for 20 to 40 seconds in a forced circulation mixer with a radial or double simultaneous radial movement of the mixing arms. After thorough mixing, a whole batch of microsilica is added to it under constant mixing during 10 to 15 seconds and the mixture thus prepared is mixed for another 40 to 80 seconds. Next, a whole batch of cement is added to it during 10 to 20 seconds under constant mixing and the mixture thus prepared is mixed for another 40 to 80 seconds. Subsequently, the mixture is sprinkled with a whole batch of mixing water (which, if appropriate, contains at least one additive conventionally used in concrete) under constant mixing during 40 to 60 seconds or the whole batch of mixing water (which, if appropriate, contains at least one additive conventionally used in concrete) is sprayed on it during 40 to 60 seconds. After another 80 to 160 seconds of mixing, fresh concrete is prepared, in which 100% by weight of the aggregate is formed by the recyclate made from inert construction and demolition waste.

The preparation of a dry mixture for the preparation of such fresh concrete is then performed in an analogous manner, without the addition of mixing water and with the use of dried recyclate and, if appropriate, also with other added components.

Example 9

To prepare concrete according to the invention, mixed recyclate made from inert construction and demolition waste with a fraction of 0 to 8 mm is mixed for 20 to 40 seconds in a forced circulation mixer with a radial or double simultaneous radial movement of the mixing arms. After thorough mixing, concrete recyclate with a fraction of 0 to 8 mm or natural aggregate with upper fraction of up to 8 mm (up to a maximum of 30% by weight of the total aggregate) is added to it under constant mixing and the mixture thus prepared is mixed for another 20 to 40 seconds. Next, a whole batch of microsilica is added to it during 10 to 15 seconds under constant mixing and the mixture thus prepared is mixed for an additional 40 to 80 seconds. After thorough mixing, a whole batch of cement is added to it under constant mixing during 10 to 20 seconds and the mixture thus prepared is mixed for another 40 to 80 seconds. Subsequently, the mixture is sprinkled with a whole batch of mixing water (which, if appropriate, contains at least one additive conventionally used in concrete) during 40 to 60 seconds under constant mixing or the whole batch of mixing water (which, if appropriate, contains at least one additive conventionally used in concrete) is sprayed on it during 40 to 60 seconds. After another 80 to 160 seconds of mixing, fresh concrete is prepared, in which 70 to 100% by weight of the aggregate is formed by recyclate made from inert construction and demolition waste.

The preparation of a dry mixture for the preparation of such fresh concrete is then performed in an analogous manner, without the addition of mixing water and with the use of dried recyclate and, if appropriate, also with other added components.

Example 10

To prepare concrete according to the invention, dedusted concrete recyclate with a fraction of 1 to 8 mm is mixed for 20 to 40 seconds in a forced circulation mixer with a radial or double simultaneous radial movement of the mixing arms. After thorough mixing, a whole batch of microsilica is added to it during 10 to 15 seconds under constant mixing and the mixture thus prepared is mixed for a further 40 to 80 seconds. After thorough mixing, a whole batch of cement is added to it during 10 to 20 seconds under constant mixing and the dry mixture thus prepared is mixed for another 40 to 80 seconds. Subsequently, the mixture is sprinkled with a whole batch of mixing water (which, if appropriate, contains at least one additive conventionally used in concrete) during 40 to 60 seconds under constant mixing or the whole batch of mixing water (which, if appropriate, contains at least one additive conventionally used in concrete) is sprayed on it during 40 to 60 seconds. After another 80 to 160 seconds of mixing, fresh concrete is prepared, in which 100% by weight of the aggregate is formed by recyclate made from inert construction and demolition waste.

The preparation of a dry mixture for the preparation of such fresh concrete is then performed in an analogous manner, without the addition of mixing water and with the use of dried recyclate and, if appropriate, also with other added components.

Example 11

To prepare concrete according to the invention, concrete recyclate with a fraction of 0 to 8 mm is mixed for 20 to 40 seconds in a forced circulation mixer with a radial or double simultaneous radial movement of the mixing arms. After thorough mixing, natural aggregate with upper fraction of up to 8 mm (up to a maximum of 30% by weight of the total aggregate) is added to it under constant mixing and the mixture thus prepared is mixed for another 20 to 40 seconds. After that, a whole batch of microsilica is added to it during 10 to 15 seconds under constant mixing and the mixture thus prepared is mixed for another 40 to 80 seconds. After thorough mixing, a whole batch of cement is added to it during 10 to 20 seconds under constant mixing and the mixture thus prepared is mixed for a further 40 to 80 seconds. Subsequently, the mixture is sprinkled with a whole batch of mixing water (which, if appropriate, contains at least one additive conventionally used in concrete) under constant mixing during 40 to 60 seconds or the whole batch of mixing water (which, if appropriate, contains at least one additive conventionally used in concrete) is sprayed on it during 40 to 60 seconds. After an additional 80 to 160 seconds of mixing, fresh concrete is prepared, in which at least 70% by weight of the aggregate is formed by recyclate made from inert construction and demolition waste.

The preparation of a dry mixture for the preparation of such fresh concrete is then performed in an analogous manner, without the addition of mixing water and with the use of dried recyclate and, if appropriate, also with other added components.

In these cases, too, after adding the last component of the aggregate (i.e. recyclate or natural aggregate) and before adding microsilica to the mixture thus prepared, it is possible to add to the mixture at least one known improving component which enhances thermal and/or acoustic and/or fire resistance properties of concrete and which is commonly used in standard concretes. Such additives include, e.g., lightweight artificial aggregates (such as such as agloporite, ceramsite, expandite, expanded perlite, etc.), cinder, scoria, polystyrene or at least one organic filler (such as wood sawdust, shavings, rice husks, shives, etc.) etc. This component constitutes up to 30% by weight of the aggregate, preferably up to 20% by weight or up to 15% by weight of the total aggregate.

The fraction of the aggregate from 0 to 16 mm described in the above-mentioned examples is not limiting to the invention, since both natural aggregate and recyclate made from inert construction and demolition waste may have higher upper fraction.

In any of the above-mentioned variants of embodiment, it is possible to replace a part of the batch of cement with a substituent of cement, for example with ground slag (ground-granulated blast-furnace slag—GGBS or GGBFS) and/or with fly ash, or with a mixture of at least two such substituents, the ratio of cement to substituents of cement in fresh concrete being from 30:70 to 70:30. The total amount of cement and substituents of cement is then the same as the amount of cement alone listed in the respective examples, i.e. 135 to 400 kg/m$^3$ of fresh concrete, or higher—up to 600 kg/m$^3$ of fresh concrete. Cement and substituent(s) of cement are added to the mixture separately either at the same time or successively in any order (adding substituents of cement first and then adding cement is preferred, but is not necessary), or in the form of a premixture of the above-described composition.

In addition to the above-described variants of embodiment, in which microsilica is added to the mixer only after the last part of the aggregate, in other variants, the total batch of microsilica, as well as the total batch of the aggregate, can be divided into two or more smaller parts (of the same or different sizes) and the individual parts of microsilica can be added successively after the addition of the individual parts of the total batch of the aggregate or of the recyclate made from construction and demolition waste of various types and/or fractions, or at least some parts of the batch of microsilica can be added simultaneously with some parts of the total batch of the aggregate or recyclate.

Example 12

To prepare concrete according to the invention, recyclate made from inert construction and demolition waste of the first composition and/or of the first fraction (e.g., fraction from 0 to 8 mm) is mixed for 20 to 40 seconds in a forced circulation mixer, afterwards the first part of the whole batch of microsilica is added during 10 to 15 seconds, and the mixture thus prepared is mixed for 20 to 60 seconds. Subsequently, under constant mixing, recyclate made from inert construction and demolition waste of the second composition and/or of the second fraction (e.g. fraction from 8 to 16 mm) or natural aggregate is added to it and the mixture thus prepared is mixed for 20 to 40 seconds. After that, the second part of the batch of microsilica is added to it during 10 to 15 seconds, whereby the whole batch of the aggregate is 1000 to 2000 kg/m$^3$ of fresh concrete and the whole batch of microsilica is 28 to 52 kg. The mixture thus prepared is further mixed for 40 to 80 seconds and then, under constant mixing, during 10 to 20 seconds is added to it 135 to 400 kg of cement or a total of 135 to 600 kg of cement combined with at least one substituent of cement, such as ground-granulated blast-furnace slag (GGBS or GGBFS) and/or fly ash in a ratio from 30:70 to 70:30. The mixture thus prepared is further mixed for an additional 40 to 80 seconds, whereupon, under constant mixing, it is sprinkled with 135 to 250 kg of mixing water for 40 to 60 seconds or this amount of the mixing water is sprayed on it during 40 to 60 seconds and, after another 80 to 160 seconds of mixing, fresh concrete is prepared, in which up to 100% of the aggregate is formed by recyclate made from inert construction and demolition waste.

Cement and at least one substituent of cement are added separately to the mixture concurrently or successively in any order (adding substituents of cement first and cement afterwards is preferred, but is not necessary) or in the form of a premixture with a ratio of cement to substituents of cement from 30:70 to 70:30.

The amount of the other components of the concrete and their fractions are in this variant the same as in Examples 1 to 11.

In an analogous manner, in variants in which recyclate made from inert construction and demolition waste of one composition or one fraction is used, its amount can be divided into two or more batches (the same or different) and these batches can be delivered to the mixer together or alternately with two or more batches of microsilica (see, e.g., examples 13 a 15).

Example 13

To prepare concrete according to the invention, the first part of the total batch of the aggregate composed of recyclate made from inert construction and demolition waste is mixed for 20 to 40 seconds in a forced circulation mixer, afterwards the first part of the whole batch of microsilica is added to it during 10 to 15 seconds and the mixture thus prepared is mixed for 20 to 60 seconds. Subsequently, the remaining part of the aggregate composed of recyclate made from inert construction and demolition waste or of natural aggregate is added to it under constant mixing, and the mixture thus prepared is mixed for 20 to 40 seconds. Subsequently, the second part of microsilica is added to it during 10 to 15 seconds, whereby the total amount of the aggregate is 1000 to 2000 kg/m$^3$ of fresh concrete and the whole batch of microsilica is 28 to 52 kg/m$^3$ of fresh concrete. The mixture thus prepared is further mixed for 40 to 80 seconds and after that, under constant mixing, to the mixture is added during 10 to 20 seconds 135 to 400 kg of cement or a total of 135 to 600 kg of cement combined with at least one substituent of cement, such as ground-granulated blast-furnace slag (GGBS nebo GGBFS) and/or fly ash in a ratio ranging from 30:70 to 70:30. The mixture thus prepared is mixed for another 40 to 80 seconds, whereupon, under constant mixing, it is sprinkled with 135 to 250 kg of mixing water for 40 to 60 seconds or this amount of the mixing water is sprayed on it during 40 to 60 seconds, and after another 80 to 160 seconds of mixing, fresh concrete is prepared, in which up to 100% of the aggregate is formed by recyclate made from inert construction and demolition waste.

Cement and at least one substituent of cement are separately added into the mixture concurrently or successively in any order (adding substituents of cement first and then cement is preferred, but is not necessarily) or in the form of a premixture with a ratio of cement to substituents of cement from 30:70 to 70:30.

The amount of the other components of the concrete and their fractions are in this variant the same as in Examples 1 to 11.

Example 14

To prepare concrete according to the invention, recyclate made from inert construction and demolition waste of the first composition and/or the first fraction (e.g. fraction from 0 to 4 mm) is mixed for 20 to 40 seconds in a forced circulation mixer, afterwards the first part of the whole batch of microsilica is added to it during 10 to 15 seconds and the mixture thus prepared is mixed for 20 to 60 seconds. Subsequently, under constant mixing, to the mixture is added recyclate made from inert construction and demolition waste of the second composition and/or second fraction (e.g. fraction from 4 to 8 mm) or a part of the whole batch of the natural aggregate, and the mixture thus prepared is mixed for 20 to 40 seconds. After that, the second part of the whole batch of microsilica is added to it during 10 to 15 seconds, and the mixture thus prepared is mixed for a further 20 to 60 seconds. Subsequently, under constant mixing, recyclate made from inert construction and demolition waste of the third composition and/or of the third fraction (e.g., fraction from 8 to 16 mm) or the remaining part of the batch of the natural aggregate is added to it, and the mixture thus prepared is mixed for 20 to 40 seconds and then the third part of the whole batch of microsilica is added to it during 10 to 15 seconds, whereby the total amount of the aggregate is 1000 to 2000 kg/m$^3$ of fresh concrete and the whole batch of microsilica is 28 to 52 kg/m$^3$ of fresh concrete. The mixture thus prepared is mixed for 40 to 80 seconds and then, under constant mixing, during 10 to 20 seconds, to the mixture is added 135 to 400 kg of cement or a total of 135 to 600 kg of cement combined with at least one substituent of cement, such as ground-granulated blast-furnace slag (GGBS nebo GGBFS) and/or fly ash, the ratio of cement to substituents of cement in fresh concrete ranging from 30:70 to 70:30. The mixture thus prepared is mixed for an additional 40 to 80 seconds, whereupon, under constant mixing, it is sprinkled with 135 to 250 kg of mixing water for 40 to 60 seconds or this amount of the mixing water is sprayed on it during 40 to 60 seconds and, after another 80 to 160 seconds of mixing, fresh concrete is prepared, in which up to 100% of the aggregate is formed by recyclate made from inert construction and demolition waste.

Cement and at least one substituent of cement are separately added into the mixture concurrently or successively in any order (adding substituents of cement first and then cement is preferred, but is not necessary) or in the form of a premixture with a ratio of cement to substituents of cement from 30:70 to 70:30.

The amount of the other components of the concrete and their fractions are in this variant the same as in Examples 1 to 11.

Example 15

To prepare concrete according to the invention, the first part of the whole batch of the aggregate formed by recyclate made from inert construction and demolition waste is mixed for 20 to 40 seconds in a forced circulation mixer, after that the first part of the whole batch of microsilica is added during 10 to 15 seconds and the mixture thus prepared is mixed for 20 to 60 seconds. Next, under constant mixing, to the mixture is added the second part of the whole batch of the aggregate formed by recyclate made from inert construction and demolition waste of the same composition and/or fraction as the first part of the whole batch of the aggregate or by natural aggregate, and the mixture thus prepared is mixed for 20 to 40 seconds. After that, the second part of the whole batch of microsilica is added to it during 10 to 15 seconds. The mixture thus prepared is further mixed for 20 to 60 seconds. Then, under constant mixing, to the mixture is added the third part of the whole batch of the aggregate formed by recyclate made from inert construction and demolition waste of the same composition and/or fraction as the first part of the total batch of the aggregate, or by natural aggregate and the mixture thus prepared is mixed for 20 to 40 seconds. Subsequently, the third part of the total batch of microsilica is added to it during 10 to 15 seconds, whereby the total batch of the aggregate is 1000 to 2000 kg/m$^3$ of fresh concrete and the total batch of microsilica is 28 to 52 kg/m$^3$ of fresh concrete. The mixture thus prepared is mixed for 40 to 80 seconds and then, under constant mixing, to the mixture is added during 10 to 20 seconds 135 to 400 kg of cement or a total of 135 to 600 kg of cement combined with at least one substituent of cement, such as ground-granulated blast-furnace slag (GGBS or GGBFS) and/or fly ash, whereby the ratio of cement to substituents of cement in fresh concrete ranges from 30:70 to 70:30. The mixture thus prepared is mixed for another 40 to 80 seconds, whereupon, it is sprinkled with 135 to 250 kg of mixing water for 40 to 60 seconds under constant mixing or this amount of the mixing water is sprayed on it during 40 to 60 seconds and, after another 80 to 160 seconds of mixing, fresh concrete is prepared, in which up to 100% of the aggregate is formed by recyclate made from inert construction and demolition waste.

Cement and at least one substituent of cement are separately added into the mixture concurrently or successively in any order (adding substituents of cement first and then cement is preferred, but is not necessary), or in the form of a premixture with a ratio of cement to substituents of cement from 30:70 to 70:30.

The amount of the other components of the concrete and their fractions are in this variant the same as in Examples 1 to 11.

All types of concrete according to the invention are designed for both manual and machine processing (including spraying concrete) and are suitable for conventional concrete structures from both plain concrete and ferroconcrete. In addition to fresh concrete (transport concrete) for the construction of houses, hotels, residential buildings, office buildings, industrial buildings, production halls, special purpose facilities, medical facilities, etc., or for the construction of their parts, such as pillars and posts, floors, lintels in lengths up to 6 m, bases, screeding, etc., these concretes can be also used for the production of concrete products and prefabricated elements, e.g., concrete blocks and bricks, paving blocks, slabs, blocks, curbs, various elements of garden architecture, ceiling beams and inserts, etc.

Moreover, the concretes in all the variants are 100% recyclable using the same method by which they were prepared.

The invention claimed is:

1. A method for preparation of 1 m$^3$ of fresh concrete from a mixture utilizing recyclate made from inert construction and demolition waste, comprising:

mixing 1000 to 2000 kg of aggregate for 20 to 40 seconds in a forced circulation mixer, wherein 40% to 100% by weight of the aggregate is recyclate made from inert construction and demolition waste;

then adding 28 to 52 kg of microsilica to the mixture during 10 to 15 seconds under constant mixing, and then continuing the mixing for 40 to 80 seconds, whereby the microsilica covers particles of the recyclate and fills up pores in the recyclate and overall lattice structure of the concrete being produced;

after the continued mixing and during 10 to 20 seconds under constant mixing, adding to the mixture 135 to 400 kg of cement or cement and at least one substituent of cement in a total amount of 135 to 600 kg and a ratio of cement to substituents of cement being from 30:70 to 70:30;

then further mixing the mixture for 40 to 80 seconds;

then sprinkling or spraying the mixture with 135 to 250 kg of mixing water for 40 to 60 seconds under constant mixing such that a surface of the cement is gradually wetted and a cementing compound being formed gradually adheres to the particles of the recyclate already coated with the microsilica; and continuing mixing of the mixture for another 80 to 160 seconds, wherein fresh concrete is prepared.

2. The method for the preparation of fresh concrete according to claim 1, wherein:

100% of the aggregate comprises 1000 to 1530 kg of the recyclate made from inert construction and demolition waste in a form of a two-fractional recyclate of one or a combination of: brick recyclate consisting at least of a majority of crushed bricks; ceramic recyclate consisting at least of a majority of crushed ceramics from ceramic building or fitting objects; or mixed recyclate made from rubble of inert construction and demolition waste, the two-fractional recyclate having fractions of 0 to 8 mm particle size and 8 to 16 mm particle size, wherein a mutual ratio of the fractions is from 30:70 to 50:50.

3. The method for the preparation of fresh concrete according to claim 2, wherein:

the aggregate comprises 1355 to 1660 kg of the two-fractional recyclate, and wherein the mixture comprises:

35 to 45 kg of the microsilica;

170 to 210 kg of the cement or 170 to 600 kg of cement with cement substituents; and 180 to 230 kg of the mixing water.

4. The method for the preparation of fresh concrete according to claim 1, wherein the aggregate comprises 1000 to 1530 kg of the recyclate made from inert construction and demolition waste in a form of a single-fractional recyclate of one or a combination of: recyclate consisting at least of a majority of crushed bricks; ceramic recyclate consisting at least of a majority of crushed ceramics from ceramic building or fitting objects; and mixed recyclate made from rubble of inert construction and demolition waste, the single-fractional recyclate having a fraction of 0 to 8 mm particle size.

5. The method for the preparation of fresh concrete according to claim 4, wherein:
the aggregate comprises 1355 to 1660 kg of the single-fractional recyclate, and wherein the mixture comprises:
35 to 45 kg of the microsilica;
170 to 210 kg of the cement or 170 to 600 kg of cement with cement substituents; and
180 to 230 kg of the mixing water.

6. The method for the preparation of fresh concrete according to claim 1, wherein:
the aggregate comprises 1140 kg to 1200 kg of the recyclate made from inert construction and demolition waste in a form of a two-fractional concrete recyclate comprising at least a majority of crushed concrete or other crushed material containing cement and having fractions of 1 to 8 mm particle size and 8 to 16 mm particle size in a mutual ratio of the fractions from 30:70 to 50:50.

7. The method for the preparation of fresh concrete according to claim 1, wherein:
the aggregate comprises 1140 kg to 1200 kg of the recyclate made from inert construction and demolition waste in a form of a single-fractional concrete recyclate comprising at least a majority of crushed concrete or other crushed material containing cement and having a fraction of 1 to 8 mm particle size.

8. The method for the preparation of fresh concrete according to claim 1, wherein:
the aggregate comprises the recyclate made from inert construction and demolition waste in a form of one or a combination of: brick recyclate consisting at least of a majority of crushed bricks; ceramic recyclate consisting at least of a majority of crushed ceramics from ceramic building or fitting objects; mixed recyclate made from rubble of inert construction and demolition waste; and concrete recyclate comprising at least a majority of crushed concrete or other crushed material containing cement;
after the mixing of the aggregate for 20 to 40 seconds in the forced circulation mixer, adding an additional aggregate to the mixture, wherein the additional aggregate is a natural aggregate or one of the recyclates different from the recyclate to which it is added, and mixing the mixture for another 20 to 40 seconds.

9. The method for the preparation of fresh concrete according to claim 8, wherein:
the aggregate comprises 765 kg to 1135 kg of the recyclate made from inert construction and demolition waste in a form of two-fractional recyclate formed from the brick, ceramic, or mixed recyclates, the two-fractional recyclate having fractions of 0 to 8 mm particle size and 8 to 16 mm particle size, whereby a mutual ratio of the fractions is from 30:70 to 50:50; and
the additional aggregate comprising 390 kg to 530 kg of natural aggregate with an upper fraction of up to 16 mm particle size.

10. The method for the preparation of fresh concrete according to claim 9, wherein:
the aggregate comprises 945 kg to 1250 kg of the two-fractional recyclate, and wherein the mixture comprises:
350 to 515 kg of the natural aggregate;
35 to 45 kg of the microsilica;
170 to 255 kg of the cement or 170 to 600 kg of cement with cement substituents;
170 to 235 kg of the mixing water; and
at least 70% by weight of the aggregate is formed by the two-fractional recyclate.

11. The method for the preparation of fresh concrete according to claim 8, wherein:
the aggregate comprises 765 kg to 1135 kg of the recyclate made from inert construction and demolition waste in a form of a single-fractional recyclate formed from the brick, ceramic, or mixed recyclates, the single-fractional recyclate having a fraction of 0 to 8 mm particle size; and
the additional aggregate comprising 390 kg to 530 kg of natural aggregate with an upper fraction of up to 8 mm particle size.

12. The method for the preparation of fresh concrete according to claim 11, wherein:
the aggregate comprises 945 to 1250 kg of the single-fractional recyclate, and wherein the mixture comprises:
350 to 515 kg of the natural aggregate;
35 to 45 kg of the microsilica;
170 to 255 kg of the cement or 170 to 600 kg of cement with cement substituents;
170 to 235 kg of the mixing water; and
at least 70% by weight of the aggregate is formed by the single-fractional recyclate.

13. The method for the preparation of fresh concrete according to claim 8, wherein:
the aggregate comprises 765 to 975 kg of the recyclate made from inert construction and demolition waste in a form of two-fractional recyclate formed from the brick, ceramic, or mixed recyclates, the two-fractional recyclate having fractions of 0 to 8 mm particle size and 8 to 16 mm particle size, whereby a mutual ratio of the fractions is from 30:70 to 50:50; and
the additional aggregate comprising 460 to 765 kg of a two-fractional concrete recyclate comprising at least a majority of crushed concrete or another crushed material containing cement having fractions of 0 to 8 mm particle size and 8 to 16 mm particle size, whereby a mutual ratio of the fractions is from 30:70 to 50:50.

14. The method for the preparation of fresh concrete according to claim 13, wherein:
the aggregate comprises 685 to 1075 kg of the two-fractional recyclate and 450 to 845 kg of the additional two-fractional concrete recyclate, and wherein the mixture comprises:
35 to 45 kg of the microsilica;
170 to 255 kg of the cement or 170 to 600 kg of cement with cement substituents; and
165 to 250 kg of the mixing water.

15. The method for the preparation of fresh concrete according to claim 8, wherein:
the aggregate comprises 765 to 975 kg of the recyclate made from inert construction and demolition waste in a form of a single-fractional recyclate formed from the brick, ceramic, or mixed recyclates, the single fractional recyclate having a fraction of 0 to 8 mm; and
the additional aggregate comprising 460 to 765 kg of concrete recyclate comprising at least a majority of crushed concrete or another crushed material containing cement, the concrete recyclate having a fraction of 0 to 8 mm particle size.

16. The method for the preparation of fresh concrete according to claim 15, wherein:
the aggregate comprises 685 kg to 1075 kg of the single-fractional recyclate and 450 to 845 kg of the additional concrete recyclate, and wherein the mixture comprises:
35 to 45 kg of the microsilica;
170 to 255 kg of the cement or 170 to 600 kg of cement with cement substituents; and
165 to 250 kg of the mixing water.

17. The method for the preparation of re h concrete according to claim 8, wherein:
the aggregate comprises 1055 kg to 1200 kg of the recyclate made from inert construction and demolition waste in a form of a two-fractional recyclate formed from the concrete recyclate having fractions of 0 to 8 mm particle size and 8 to 16 mm particle size, whereby a mutual ratio of the fractions is from 30:70 to 50:50; and
the additional aggregate comprises 350 to 600 kg 390 to 530 kg of natural aggregate with an upper fraction of up to 16 mm.

18. The method for the preparation of fresh concrete according to claim 17, wherein:
the aggregate comprises 1025 to 1320 kg of the two-fractional concrete recyclate and 450 to 585 of the natural aggregate, and wherein the mixture comprises:
35 to 45 kg of the microsilica;
170 to 255 kg of the cement or 170 to 600 kg of cement with cement substituents;
155 to 220 kg of the mixing water; and
at least 70% by weight of the aggregate is formed by the two-fractional concrete recyclate.

19. The method for the preparation of fresh concrete according to claim 8, wherein:
the aggregate comprises 1055 kg to 1200 kg of the recyclate made from inert construction and demolition waste in a form of a single-fractional recyclate formed from the concrete recyclate, the single-fractional recyclate having a fraction of 0 to 8 mm particle size; and
the additional aggregate comprising 390 to 530 kg of natural aggregate having an upper fraction of up to 8 mm particle size.

20. The method for the preparation of fresh concrete according to claim 19, wherein:
the aggregate comprises 1025 kg to 1320 kg of the concrete recyclate and 450 to 585 kg of the natural aggregate, and wherein the mixture comprises:
35 to 45 kg of the microsilica;
170 to 255 kg of the cement or 170 to 600 kg of cement with cement substituents;
150 to 220 kg of the mixing water; and
at least 70% by weight of the aggregate is formed by the concrete recyclate.

21. The method for the preparation of fresh concrete according to claim 8, wherein:
the aggregate comprises two types of the recyclates made from inert construction and demolition waste; and
the additional aggregate comprises natural aggregate in an amount up to 30% by weight of the total aggregate.

22. The method for the preparation of fresh concrete according to claim 1, wherein after the mixing of the recyclate made from inert construction and demolition waste, further comprising adding to the mixture under constant mixing at least one component to improve one or a combination of thermal, acoustic, and fire resistance properties of the concrete in an amount of up to 30% by weight of a total aggregate in the concrete, and then mixing the mixture for 20 to 40 seconds.

23. The method for the preparation of fresh concrete according to claim 8, wherein after the mixing of two types of the recyclate made from inert construction and demolition waste, further comprising adding to the mixture under constant mixing at least one component to improve one or a combination of thermal, acoustic, and fire resistance properties of the concrete in an amount of up to 30% by weight of a total aggregate in the concrete, and then mixing the mixture for 20 to 40 seconds.

24. The method for the preparation of fresh concrete according to claim 8, wherein after the mixing of two types of the recyclate made from inert construction and demolition waste, adding the natural aggregate in an amount up to 30% by weight of the total aggregate in the concrete and mixing the mixture for another 20 to 40 seconds, then adding to the mixture under constant mixing at least one component to improve one or a combination of thermal, acoustic, or fire resistance properties of the concrete in an amount of up to 30% by weight of a total aggregate in the concrete, and then mixing the mixture for another 20 to 40 seconds.

25. The method for the preparation of fresh concrete according to claim 1, wherein:
a first part of a total batch of the aggregate formed by the recyclate made from inert construction and demolition is mixed for 20 to 40 seconds in the forced circulation mixer;
then a first part of the total batch of the microsilica is added to the mixture during 10 to 15 seconds;
then the mixture is mixed for 20 to 60 seconds;
then a second part of the total batch of the aggregate formed by the recyclate made from inert construction and demolition waste is added to the mixture under constant mixing;
then the mixture is mixed for 20 to 40 seconds; and
then a second part of the total batch of microsilica is added to the mixture during 10 to 15 seconds.

26. The method for the preparation of fresh concrete according to claim 1, wherein:
a first part of a total batch of the aggregate formed by the recyclate made from inert construction and demolition is mixed for 20 to 40 seconds in the forced circulation mixer;
then a first part of a total batch of the microsilica is added to the mixture during 10 to 15 seconds;
then the mixture is mixed for 20 to 60 seconds;
then a second part of the total batch of the aggregate formed by the recyclate made from inert construction and demolition waste is added to the mixture under constant mixing;
then the mixture is mixed for 20 to 40 seconds;
then a second part of the total batch of microsilica is added to the mixture during 10 to 15 seconds;
then the mixture is mixed for 20 to 60 seconds;
then a third part of the total batch of the aggregate formed by the recyclate from inert construction and demolition waste is added to the mixture under constant mixing;
then the mixture is mixed for 20 to 40 seconds; and
then a third part of the total batch of microsilica is added to the mixture during 10 to 15 seconds.

27. The method for the preparation of fresh concrete according to claim 1, wherein the mixing water contains at least one additive or a mixture of additives for concrete in an amount of up to 5% by weight of the cement or cement with substituents of cement.

28. The method for the preparation of fresh concrete according to claim 1, wherein after the mixture is sprinkled or sprayed with the mixing water, at least one additive for concrete or a mixture of additives for concrete are added to the mixture in an amount of up to 5% by weight of the cement or cement with substituents of cement.

\* \* \* \* \*